(12) United States Patent
Okumura et al.

(10) Patent No.: US 6,433,304 B2
(45) Date of Patent: Aug. 13, 2002

(54) PERFORATING MACHINING METHOD WITH LASER BEAM

(75) Inventors: Tokuji Okumura, Hasuda; Kazushiro Wakabayashi, Utsunomiya; Kazuo Isogai, Sayama; Hideshi Takekuma, Utsunomiya; Tsuneo Otake, Sakado, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/742,094

(22) Filed: Dec. 22, 2000

(30) Foreign Application Priority Data

Dec. 22, 1999 (JP) .......................... 11-365484
Dec. 22, 1999 (JP) .......................... 11-365485

(51) Int. Cl.$^7$ .......................... B23K 26/00; B60R 21/20
(52) U.S. Cl. .................................. 219/121.71
(58) Field of Search ................. 219/121.6, 121.61, 219/121.62, 121.7, 121.71, 121.83, 121.85; 264/400

(56) References Cited

U.S. PATENT DOCUMENTS 5,744,776 A   4/1998   Bauer
5,882,572 A   3/1999   Lutze et al.

FOREIGN PATENT DOCUMENTS

JP   58-16784    1/1983
JP   8-282420   10/1996
JP   10-85966    4/1998

*Primary Examiner*—Samuel M. Heinrich
(74) *Attorney, Agent, or Firm*—Birch, Stewart, Kolasch & Birch, LLP

(57) ABSTRACT

Assuming that t1 represents a period of time until a detection signal is outputted after a sensor senses a laser beam passed through a through-hole of a workpiece, t2 represents a period of time until the detection signal derived from the sensor exceeds a preset threshold value, and t3 represents a period of time until radiation of the laser beam is actually stopped after the threshold value is exceeded, a total period of time (t1+t2+t3) of the periods of time t1 to t3 is set to be shorter than a time difference (T2−T3) between a pulse width (T3) and one cycle (T2) of a pulse signal for constructing a laser output command signal.

7 Claims, 9 Drawing Sheets

PERFORATING MACHINING METHOD WITH LASER BEAM

BACKGROUND OF THE INVENTION

1. Field of the Invention

The present invention relates to a perforating machining method based on the use of a laser beam, which makes it possible to form invisible minute through-holes through a workpiece by radiating the laser beam onto the workpiece. In particular, the present invention relates to a perforating machining method based on the use of a laser beam, which makes it possible to form, for example, a weak portion for an air bag of an air bag system to be installed to an automobile.

2. Description of the Related Art

In recent years, the air bag system has been widespread, for example, for vehicles such as automobiles. The air bag system is provided with an air bag which functions as an air-expandable bag to be used for an apparatus for absorbing the shock. The air bag is folded, and it is accommodated in an accommodating air bag module. When the collision of the vehicle is detected by a sensor, the air bag is instantaneously expanded by the gas supplied from a gas generator. Thus, the air bag functions as a cushion to absorb the shock applied to a driver or a passenger.

The air bag is installed in a state of being hidden in an interior part such as a steering wheel cover and an instrument panel. When the air bag is expanded, then a door panel for developing the air bag is opened by force, and the air bag is exposed to the outside of the accommodating air bag module.

In this arrangement, in order to reliably open the door panel, for example, a weak portion for the air bag is formed with a predetermined machining pattern composed of grooves, holes and the like.

As a method for forming the weak portion for the air bag, for example, Japanese Laid-Open Patent Publication No. 58-16784 discloses a method for perforating and machining a workpiece by providing a photodetector on the side of a surface opposite to a machining surface of the workpiece, and sensing, with the photodetector, a laser beam passed through a through-hole of the workpiece.

Japanese Laid-Open Patent Publication No. 8-282420 discloses a method for forming a weak portion by partially forming grooves with a laser beam for a door panel of an automobile interior cover at an opening for developing an air bag.

Japanese Laid-Open Patent Publication No. 10-85966 discloses a method for forming a linear weak portion based on the use of radiation of a controllable pulse-shaped laser beam.

However, in the case of the technical concept disclosed in Japanese Laid-Open Patent Publication No. 58-16784 concerning the conventional technique described above, the following inconvenience arises. That is, the diameter of the through-hole formed by the perforating machining is increased due to the influence of the delay time until the radiation of the laser beam is actually stopped after the laser beam is detected with the photodetector. The bored through-hole is visible, and hence the appearance quality is inferior. Further, the strength and rigidity are decreased, and hence the durability is deteriorated concerning the function of the weak portion for the air bag.

In the case of the technical concept disclosed in Japanese Laid-Open Patent Publication No. 8-282420 concerning the conventional technique described above, the following inconvenience arises. That is, a considerable burden is imposed on the investment for the equipment, because it is necessary to use the expensive sensor for sensing the laser. Further, the control of the laser beam is complicated in order to obtain a constant thickness of the weak portion for the air bag.

In the case of the technical concept disclosed in Japanese Laid-Open Patent Publication No. 10-85966 concerning the conventional technique described above, the following inconvenience arises. That is, the arrangement of the control unit is complicated, and the production cost is expensive, because a method is adopted, in which the comparison is made for the correlative reference value concerning the residual strength and the integral value obtained with a detection signal.

SUMMARY OF THE INVENTION

A general object of the present invention is to provide a perforating machining method based on a laser beam, which makes it possible to reduce the diameter of a through-hole bored by means of a convenient method without requiring any excessive equipment investment.

A principal object of the present invention is to provide a perforating machining method based on a laser beam, which makes it possible to reduce the diameter of a through-hole bored through a weak portion for an air bag by means of a convenient method without requiring any excessive equipment investment.

Another object of the present invention is to provide a perforating machining method based on a laser beam, which makes it possible to form a weak portion for an air bag having such an appearance quality that a through-hole bored by the laser beam is invisible, in which the durability is realized for the function.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
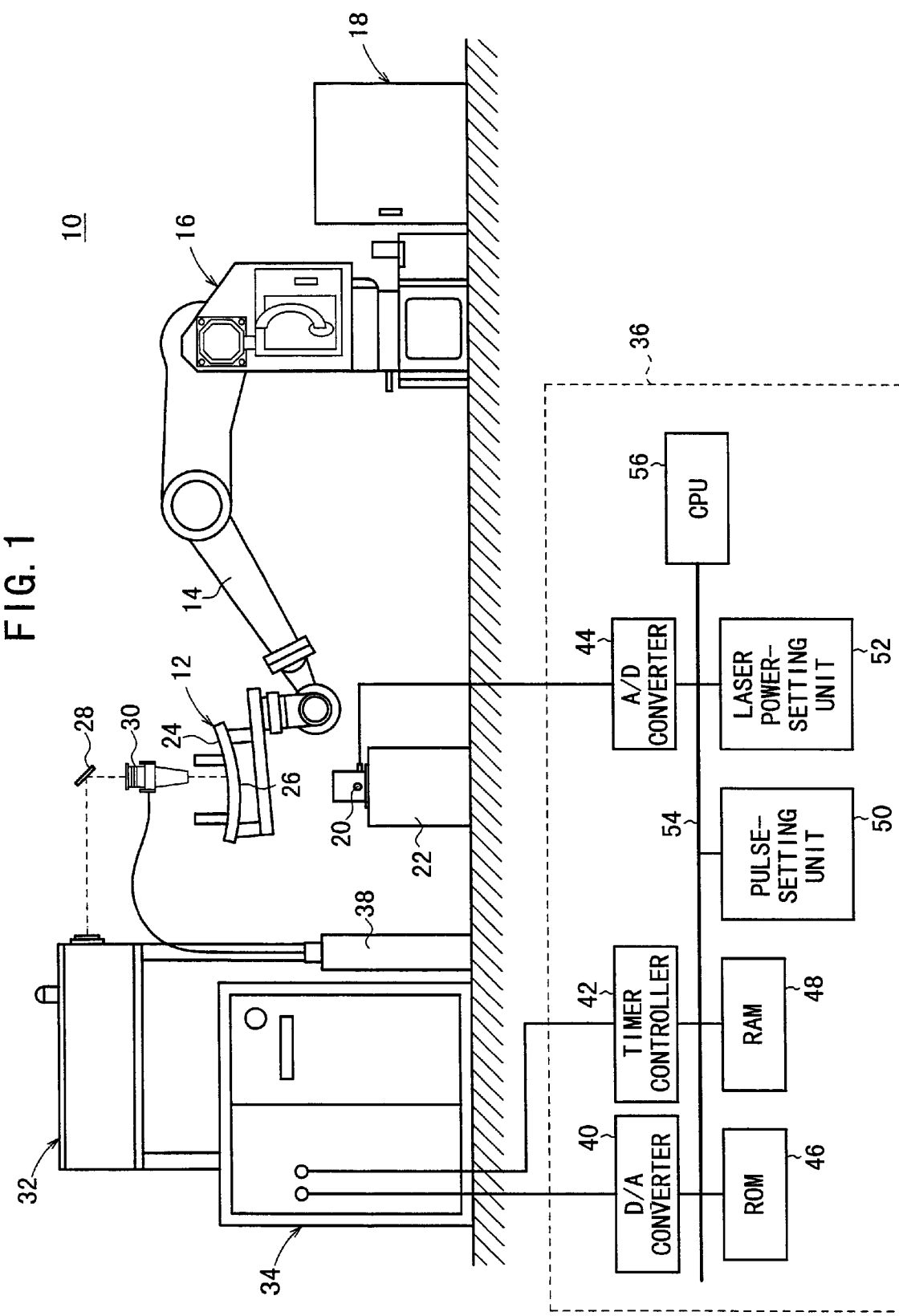
FIG. 1 shows a schematic arrangement illustrating a workpiece-machining system for carrying out a method for forming a weak portion for an air bag according to an embodiment of the present invention.

In FIG. 1, reference numeral 10 indicates a workpiece-machining system for carrying out a method for forming a weak portion for an air bag according to an embodiment of the present invention.

The workpiece-machining system 10 comprises a six-axis robot 16 which has an arm 14 for holding an instrument panel 12 as a workpiece and which causes displacement or rotational movement of the instrument panel 12 about multiple axes including three axes of X, Y, and Z, and a robot controller 18 for controlling the six-axis robot 16. The instrument panel 12 functions as a cover to be installed to an unillustrated opening for an air bag (not shown).

A sensor 20 for sensing a laser beam passed through a through-hole bored through the instrument panel 12 is placed on a support base 22 under the instrument panel 12. The instrument panel 12 is held so that the side on which the laser beam is radiated is a back surface 24, and the side opposed to the sensor 20 is a front surface 26.

The workpiece-machining system 10 further comprises a laser beam-oscillating unit 32 for forming a plurality of penetrating small holes in accordance with a predetermined machining pattern by radiating the laser beam onto the instrument panel 12 via a bend mirror 28 and a light-collecting lens 30, a laser controller 34 for controlling the laser beam-oscillating unit 32, and a feedback circuit 36 connected to the laser controller 34, for controlling the output of the laser beam on the basis of a detection signal from the sensor 20.

Those preferably used as the laser beam-oscillating unit 32 include, for example, laser oscillators based on, for example, $CO_2$, excimer, semiconductor, argon gas, and diode. An assist gas supply unit 38 for supplying gas to the focus lens 30 is arranged.

The feedback circuit 36 includes a digital/analog converter 40 for deriving a laser output command signal for the laser controller 34, a timer controller 42 for deriving a pulse command signal, and an analog/digital converter 44 for converting the analog signal into the digital signal for the detection signal outputted from the sensor 20.

The feedback circuit 36 comprises ROM 46, RAM 48, a pulse-setting unit 50 in which one cycle T1 of the pulse command signal, one cycle T2 of the laser output command signal, and a pulse width T3 of the laser output command signal are previously set, for holding the preset data as memory as described later on, and a laser power-setting unit 52 in which the output (power) of the laser beam is previously set, for holding the preset data as memory.

In this arrangement, the digital/analog converter 40, the timer controller 42, the analog/digital converter 44, ROM 46, RAM 48, the pulse-setting unit 50, and the laser power-setting unit 52 are connected to CPU 56 via a bus line 54 respectively. It is assumed that the pitch threshold preset value data, which is the distance of separation between the small holes penetrating through the instrument panel 12, is stored in ROM 46.

Figure 2:
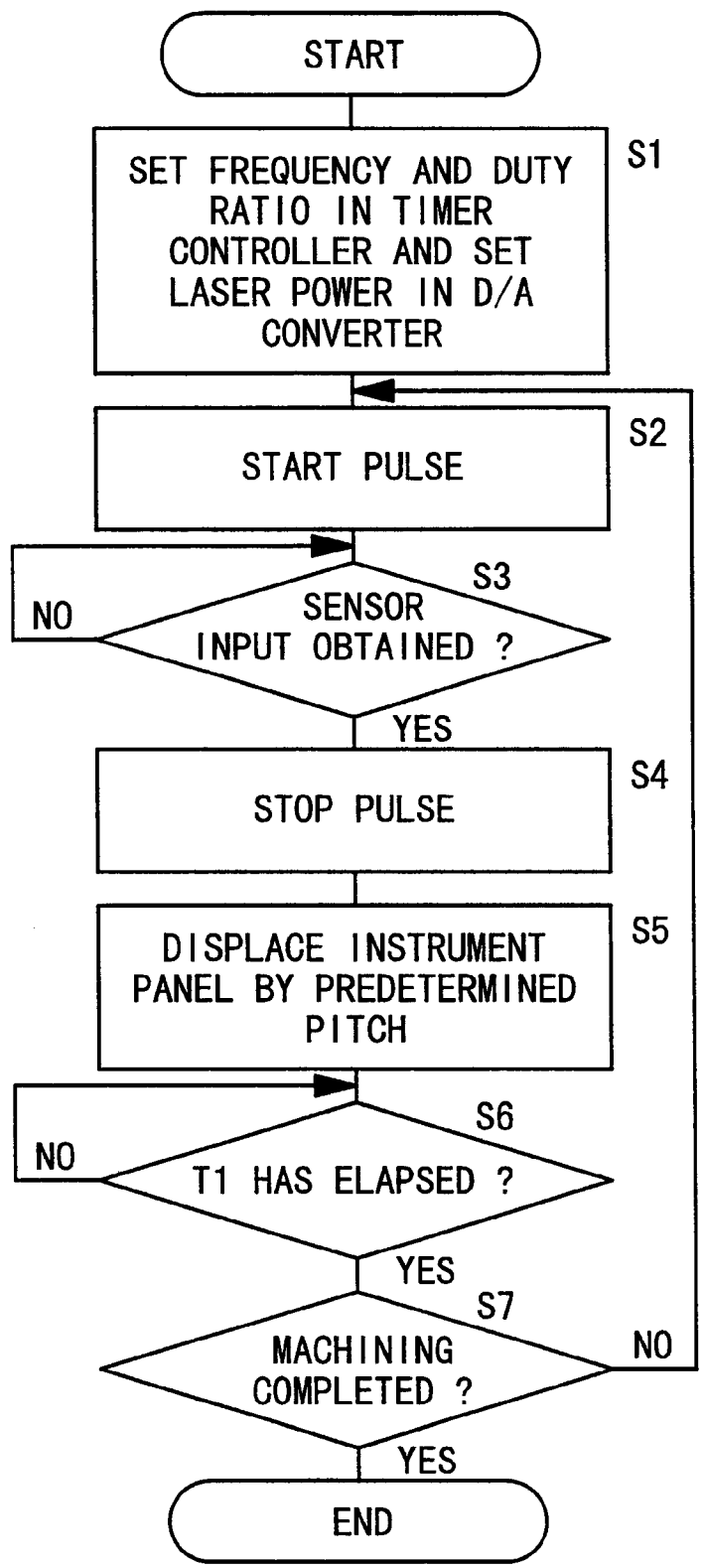
FIG. 2 shows a flow chart illustrating machining steps for forming the weak portion for the air bag at an instrument panel by using a laser beam.

The workpiece-machining system 10 for carrying out the method for forming the weak portion for the air bag according to the embodiment of the present invention is basically constructed as described above. Next, its operation, function, and effect will be explained on the basis of a flow chart shown in FIG. 2.

CPU 56 reads the data previously set in the pulse-setting unit 50 and the laser power-setting unit 52 to set the frequency (1/T2) and the duty ratio (T3/T2) in the timer controller 42 and set the laser output in the digital/analog converter 40 (step S1). Subsequently, CPU 56 derives the pulse start signal to the timer controller 42. The pulse command signal is changed from the OFF state to the ON state on the basis of the pulse start signal. Accordingly, the pulse start state is established from the pulse stop state (step S2).

Figure 3:
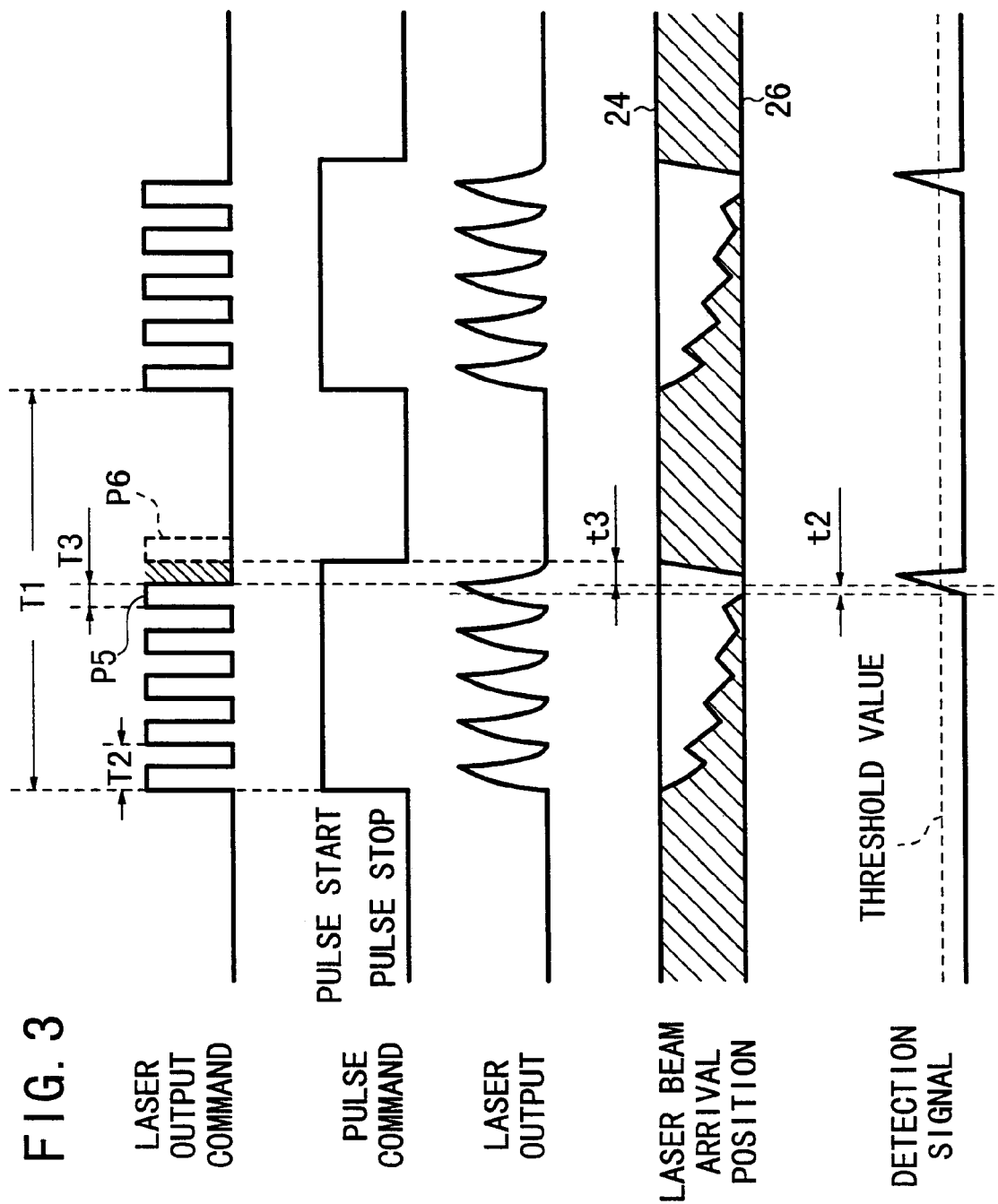
FIG. 3 shows a time chart illustrating the timing for radiating the laser beam onto the instrument panel.

When the pulse start state is established for the pulse command signal, the laser output command signal, which is composed of the pulse waveform set in the step S1, is outputted to the laser controller 34 via the digital/analog converter 40 (see FIG. 3). The laser beam is radiated from the laser beam-oscillating unit 32. The laser beam is reflected by the bend mirror 28, and then it is transmitted through the light-collecting lens 30. After that, the laser beam is radiated toward the back surface 24 of the instrument panel 12 as the workpiece. Accordingly, the laser machining is applied to the instrument panel 12.

As indicated by the "laser beam arrival position" shown in FIG. 3, the boring operation is started, and it is gradually effected from the side of the back surface 24 of the instrument panel 12 by means of the laser beam. Consequently, the penetration is achieved between the back surface 24 and the front surface 26 of the instrument panel 12. During this process, the laser beam, which has passed through the through-hole of the instrument panel 12, is sensed by the sensor 20 (see the step S3). The detection signal (feedback signal), which is derived from the sensor 20, is converted into the digital signal by the analog/digital converter 44, and then it is introduced into CPU 56. CPU 56 derives the pulse stop signal to the timer controller 42 to establish the stop state for the pulse command signal (step S4). As a result, the laser power output command signal is in the OFF state, and the radiation of the laser beam onto the instrument panel 12 is stopped. Thus, the boring machining for one through-hole is completed for the instrument panel 12.

Subsequently, the arm 14 of the six-axis robot 16 is operated in accordance with the control operation of the robot controller 18. The instrument panel 12 is displaced by a predetermined pitch, and it is positioned at a position at which the boring operation is to be performed next time in accordance with the machining pattern for the weak portion for the air bag (step S5).

Figure 4:
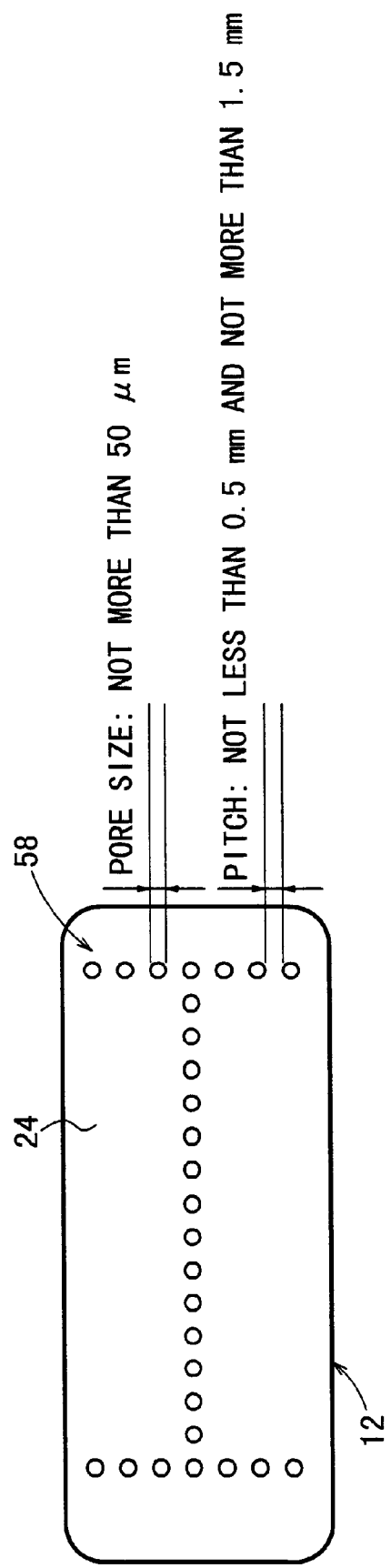
FIG. 4 shows a plan view illustrating the instrument panel in which the weak portion for the air bag is formed in accordance with a predetermined machining pattern.

When the time corresponding to one cycle T1 of the pulse command signal has elapsed (step S6), then the laser beam is radiated onto the instrument panel 12 in accordance with the steps S2 to S4, and a new through-hole is bored. When a plurality of through-holes are bored in accordance with the predetermined machining pattern, the weak portion 58 is formed as shown in FIG. 4. The machining steps for the instrument panel 12 come to an end (step S7).

In this case, as shown in FIG. 3, it is assumed that t1 (not shown) represents a period of time until the detection signal is outputted after the sensor 20 senses the laser beam passed through the through-hole of the instrument panel 12, t2 represents a period of time until the threshold value previously set in ROM 46 is exceeded after the detection signal from the sensor 20 is inputted into the analog/digital converter 44, and t3 represents a period of time until the radiation of the laser beam is actually stopped after the threshold value is exceeded. In the embodiment of the present invention, the total period of time of the periods of time t1 to t3 is set to be shorter than a period of time (T2−T3). Therefore, it is possible to stop the radiation of the laser beam before the next pulse signal P6 for constructing the laser output command signal is outputted.

Figure 6:
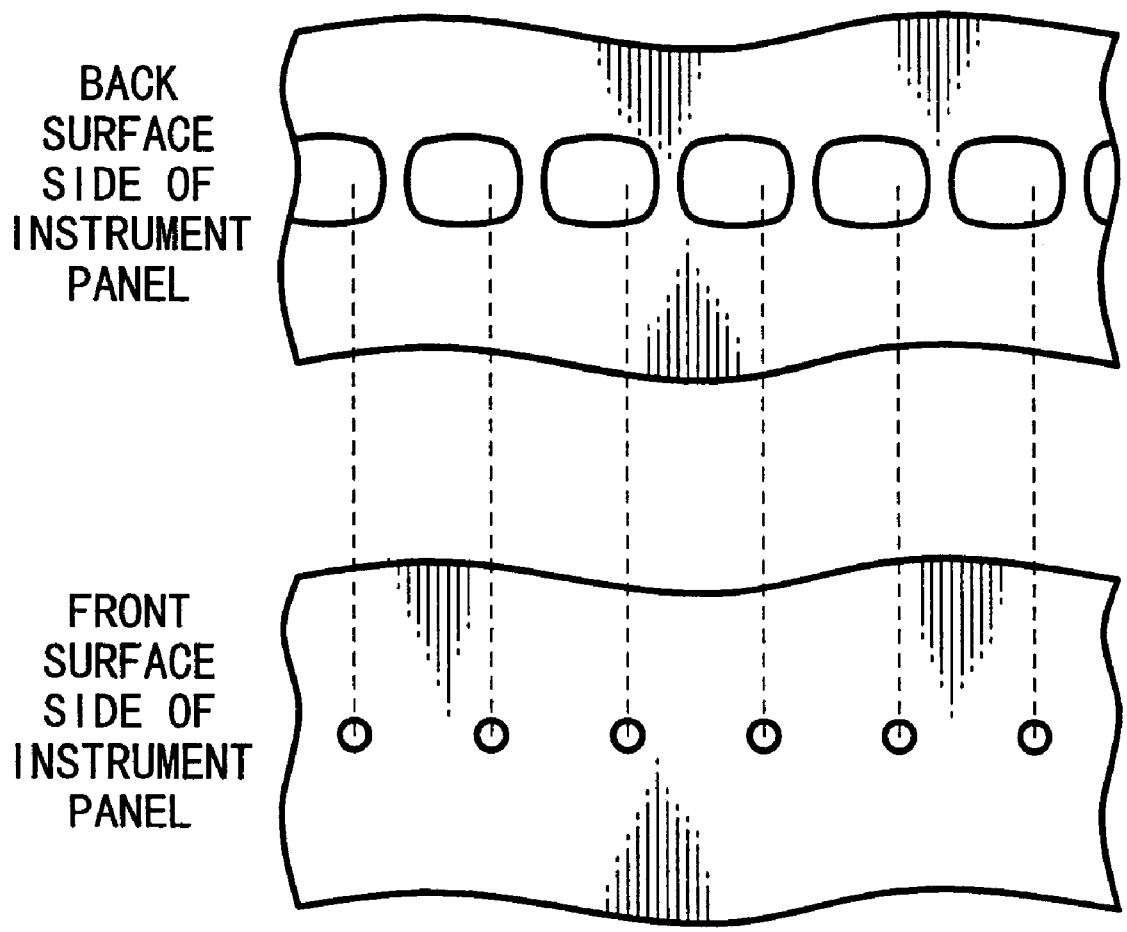
FIG. 6 shows, with partial omission, plan views as viewed from the front surface side and the back surface side respectively depicting through-holes formed through the instrument panel by means of the method for forming the weak portion for the air bag according to the embodiment of the present invention.

In other words, the total time (t1+t2+t3) of the periods of time t1 to t3 is set to be shorter than the difference in time between the pulse width T3 and one cycle T2 of the laser output command signal, i.e., the period of time between the previous pulse signal P5 and the next pulse signal P6 (see the hatched portion). Accordingly, the pulse command signal is in the OFF state before the next pulse signal P6 rises, and the output of the laser beam is stopped as the pulse signal P5 outputted just before the next pulse signal P6 falls. Therefore, the radiation of the laser beam can be quickly stopped after the sensor 20 senses the laser beam. Accordingly, it is possible to decrease the diameter of the through-hole on the side (side of the surface 26 of the instrument panel 12) which is penetrated by the laser beam (see FIG. 6).

It is preferable that the diameter of the through-hole on the side penetrated by the laser beam is within an invisible range, i.e., it is larger than 0 $\mu$m not including 0 $\mu$m, and it is not more than 50 $\mu$m. If the diameter of the through-hole on the side penetrated by the laser beam is larger than 50 $\mu$m, the following inconvenience arises, because the hole itself is visible. That is, the appearance quality is deteriorated, and the strength and the rigidity are inferior.

The most preferred range of the diameter of the through-hole is not less than 10 $\mu$m and not more than 30 $\mu$m. In this range, it is possible to improve the appearance quality of the air bag cover, and it is possible to increase the durability of the function of the weak portion 58.

It is preferable that the distance of separation (pitch) between the through-holes formed in accordance with the machining pattern is within a range of not less than 0.5 mm and not more than 1.5 mm.

Figure 5:
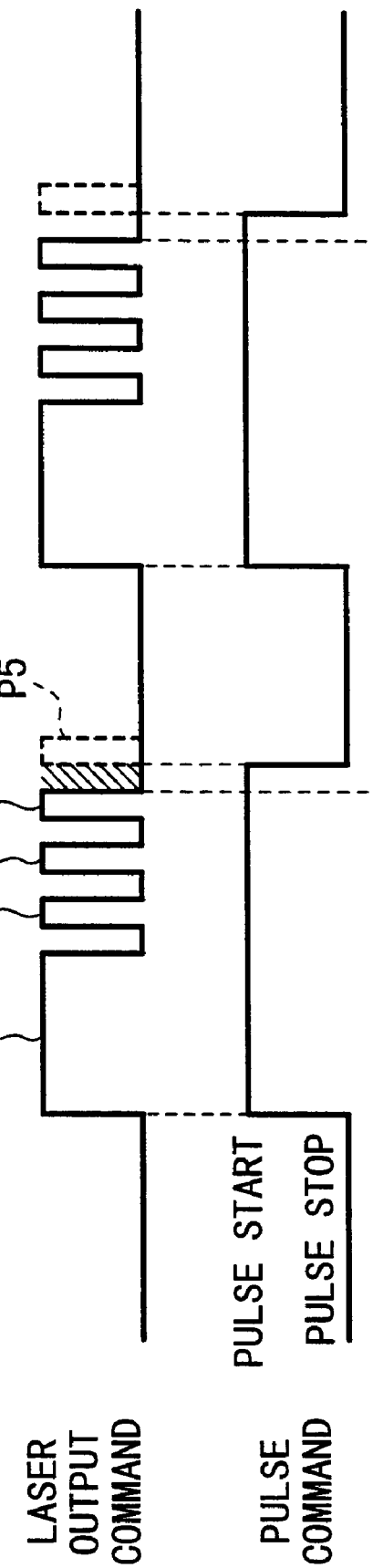
FIG. 5 shows a time chart illustrating another method for radiating the laser beam onto the instrument panel.

As shown in FIG. 5, the following procedure is preferably adopted. That is, the laser output is controlled by means of a continuous laser output command signal P1 (laser output command signal in which the ON state is continued for a predetermined period of time) when the through-hole machining is started. Further, the laser output is controlled by means of a plurality of pulse signals P2 to P4 composed of ON/OFF states just before the laser beam is sensed by the sensor 20, i.e., just before the through-hole is formed through the instrument panel 12 by means of the laser beam. In this procedure, the pulse command signal is in the OFF state before the next pulse signal P5 is outputted, which is performed in the same manner as described above.

Figure 7:
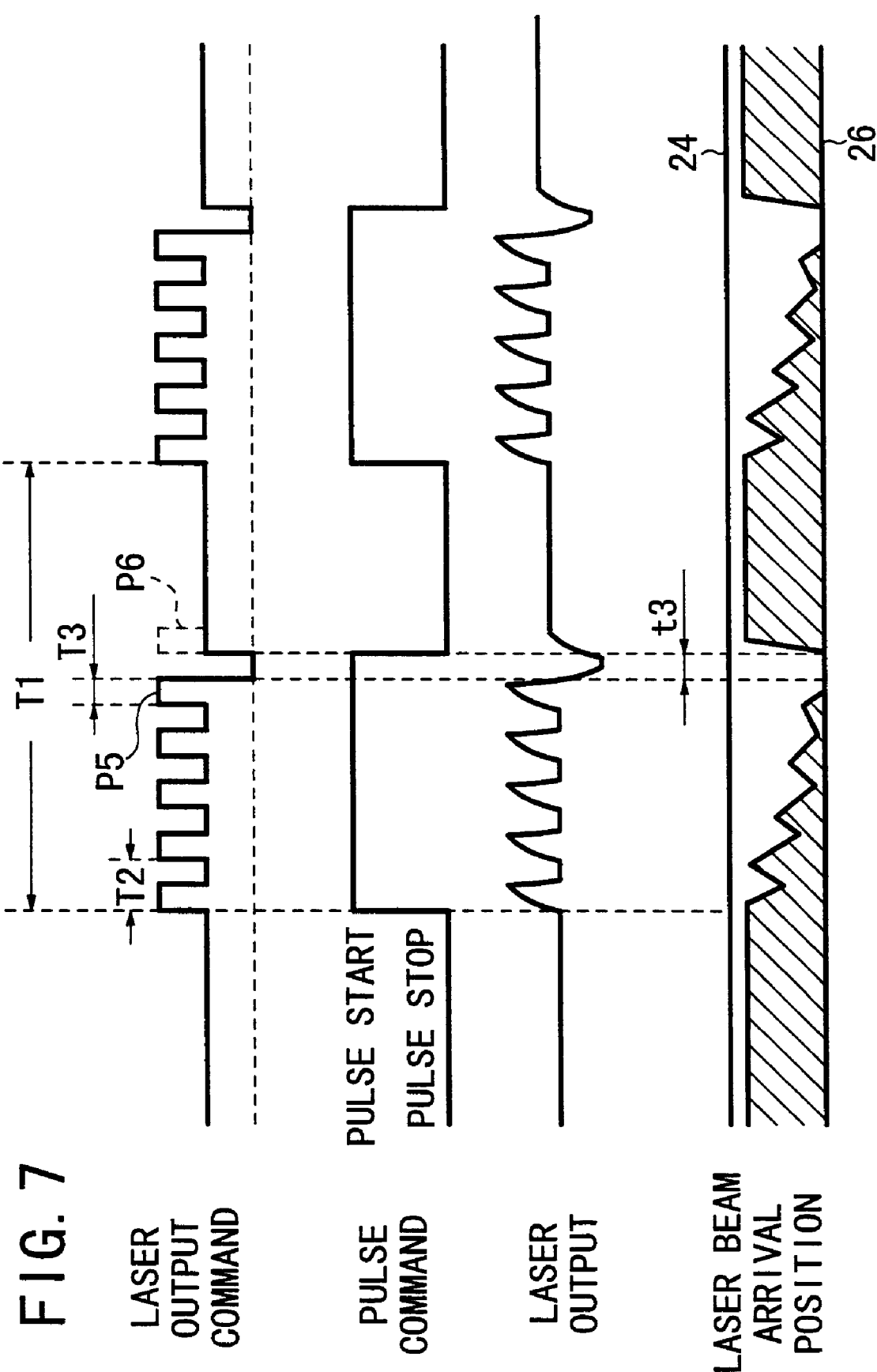
FIG. 7 shows a time chart illustrating still another method for radiating the laser beam onto the instrument panel.
Figure 8:
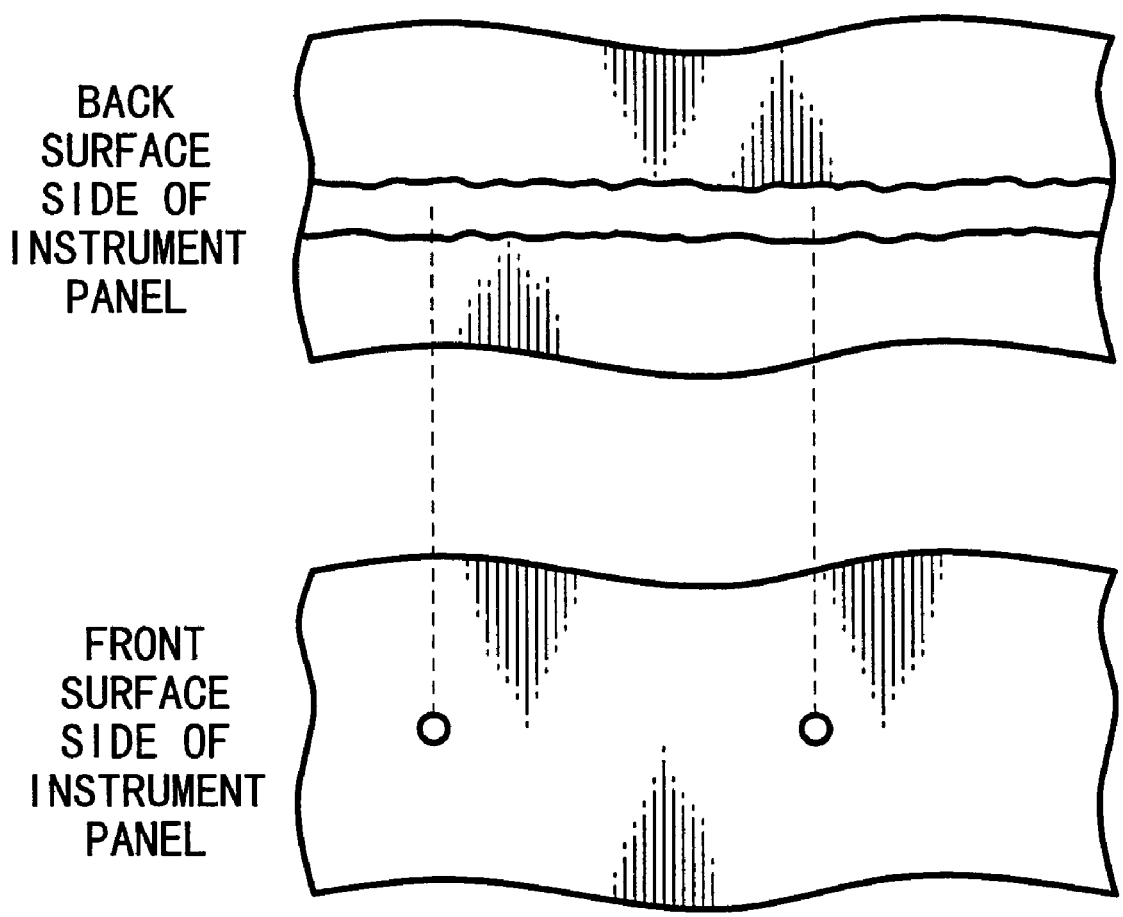
FIG. 8 shows, with partial omission, plan views as viewed from the front surface side and the back surface side respectively depicting through-holes formed through the instrument panel by means of the method shown in FIG. 7.

As shown in FIG. 7, the laser beam may be radiated onto the instrument panel 12 by using a laser output command signal composed of a pulse signal level-shifted by a predetermined value by using a level shifter (not shown). In this case, as shown in FIG. 8, a continuous groove is formed on the side of the back surface 24 of the instrument panel 12 onto which the laser beam is radiated. When the pulse signal is completely in the OFF state (see FIG. 7), it is possible to further decrease the diameter of the through-hole penetrating on the side of the front surface 26 of the instrument panel 12.

Figure 9:
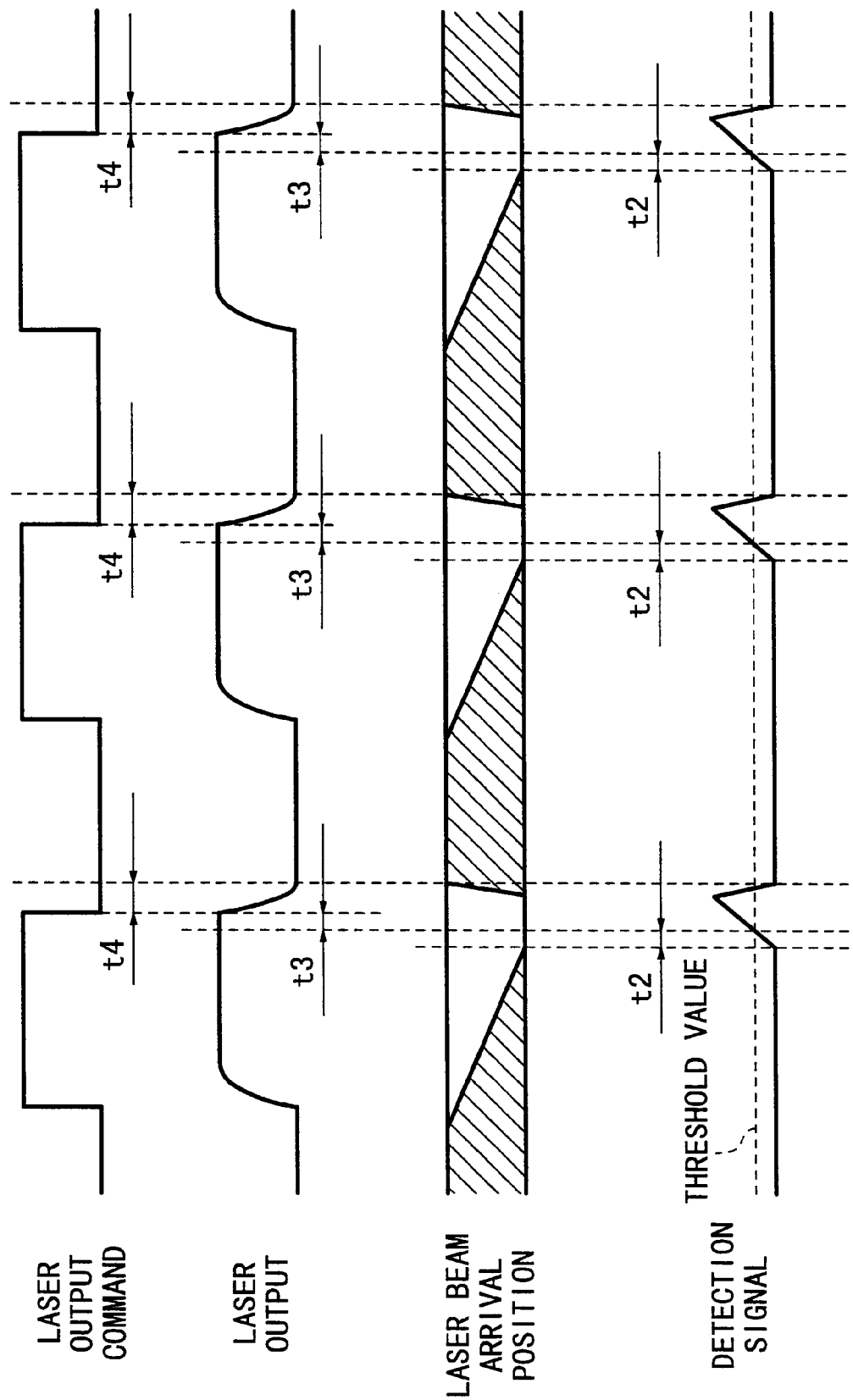
FIG. 9 shows a time chart illustrating the timing for radiating a laser beam concerning Comparative Example.

Next, a case as Comparative Example is shown in FIG. 9, in which the through-hole machining is performed for one hole by using a continuous laser output.

In this case, as shown in FIG. 9, it is assumed that t1 (not shown) represents a period of time until the detection signal is outputted after the sensor 20 senses the laser beam passed through the through-hole of the instrument panel 12, t2 represents a period of time until the threshold value previously set in ROM 46 is exceeded after the detection signal from the sensor 20 is inputted into the analog/digital converter 44, t3 represents a period of time until the laser output signal is in the OFF state after the threshold value is exceeded, and t4 represents a period of time until the radiation of the laser beam from the laser beam-oscillating unit 32 is actually stopped after the laser output signal is in the OFF state. In Comparative Example, the total period of time (t1+t2+t3+t4) of the periods of time t1 to t4 respectively is the delay time. Therefore, it is difficult to shorten the radiation time of the laser beam after the sensor 20 senses the laser beam. There is a limit to reduce the diameter of the through-hole formed by the laser beam.

The "laser beam arrival position" in FIGS. 3, 7, and 9 is conveniently expresses how far the laser beam radiated in the thickness direction of the instrument panel 12 as the workpiece arrives, which is not depicted in a time-dependent manner. In this case, the wave form, which indicates the arrival position of the laser beam, expresses the machining state based on the pulse signal. Actually, the movement speed of the instrument panel 12 is slow as compared with the pulse frequency. Therefore, the machining is effected in the groove-shaped configuration, and no indented wave form is formed on the inner circumferential surface of the penetrated through-hole.

In the embodiment of the present invention, the period of time (t1+t2+t3), which is obtained by adding the periods of time t1 to t3 respectively, is set to be shorter than the period of time (T2−T3). Accordingly, the delay time can be shortened, and it is possible to reduce the diameter of the through-hole (through-hole on the side of the penetrated surface 26) formed by the laser beam, as compared with Comparative Example. Further, in the embodiment of the present invention, no complicated control method is used. The present invention can be carried out by using the simple apparatus. Therefore, an advantage is obtained such that the production cost can be reduced.

What is claimed is:

1. A perforating machining method based on the use of a laser beam, comprising the steps of:

forming a through-hole through a workpiece by radiating said laser beam toward said workpiece; and sensing said laser beam passed through said through-hole by means of a sensor to stop radiation of said laser beam on the basis of a detection signal derived from said sensor, wherein:

a pulse signal for controlling said laser beam is set so that a period of time until said radiation of said laser beam is stopped after said laser beam passed through said through-hole is sensed by said sensor is shorter than a period of time until the next pulse signal to be continued is in an ON state.

2. The perforating machining method based on the use of said laser beam according to claim 1, wherein said laser beam is controlled by a plurality of pulse-shaped laser output command signals, and a total period of time (t1+t2+t3) of periods of time t1 to t3 is set to be shorter than a time difference (T2−T3) between a pulse width (T3) and one cycle (T2) of said pulse signal for constructing said laser output command signal, assuming that t1 represents a period of time until said detection signal is outputted after said sensor senses said laser beam passed through said through-hole of said workpiece, t2 represents a period of time until said detection signal derived from said sensor exceeds a preset threshold value, and t3 represents a period of time until said radiation of said laser beam is actually stopped after said threshold value is exceeded.

3. The perforating machining method based on the use of said laser beam according to claim 2, wherein said plurality of pulse-shaped laser output command signals are composed of ON/OFF signals.

4. The perforating machining method based on the use of said laser beam according to claim 2, wherein said plurality of pulse-shaped laser output command signals are composed of ON/OFF signals each of which is level-shifted by a predetermined value.

5. A perforating machining method based on the use of a laser beam for forming a weak portion for an air bag by boring a plurality of minute through-holes through a cover installed to an opening for said air bag as an automobile part, said method comprising the steps of:

applying through-hole machining to said cover by radiating said laser beam toward a back surface of said cover;

sensing said laser beam passed through said through-hole of said cover by means of a sensor to stop radiation of said laser beam on the basis of a detection signal derived from said sensor; and relatively displacing a laser beam-oscillating unit and said cover by a predetermined pitch to form said weak portion including said plurality of through-holes in accordance with a predetermined machining pattern, wherein:

a part of said weak portion, which is disposed on a side of said back surface of said cover, is formed as a substantially linear groove, while a part of said weak portion, which is disposed on a side of a front surface of said cover, is formed by said plurality of through-holes separated from each other by a predetermined pitch.

6. The perforating machining method based on the use of said laser beam according to claim 5, wherein a diameter of said through-hole on said side of said front surface of said cover is formed to be not more than about 50 $\mu$m.

7. The perforating machining method based on the use of said laser beam according to claim 5, wherein said laser beam, which is radiated from said laser beam-oscillating unit, is controlled on the basis of a laser output command signal composed of a plurality of pulse-shaped ON/OFF signals.

* * * * *